(12) United States Patent
Biwersi et al.

(10) Patent No.: US 12,467,482 B2
(45) Date of Patent: Nov. 11, 2025

(54) VALVE DEVICE

(71) Applicant: HYDAC Mobilhydraulik GmbH, Sulzbach / Saar (DE)

(72) Inventors: Sascha Alexander Biwersi, Mettlach (DE); Kai Sumpf, Schwalbach (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 24 days.

(21) Appl. No.: 18/546,412

(22) PCT Filed: Jan. 31, 2022

(86) PCT No.: PCT/EP2022/052236
§ 371 (c)(1),
(2) Date: Aug. 14, 2023

(87) PCT Pub. No.: WO2022/171478
PCT Pub. Date: Aug. 18, 2022

(65) Prior Publication Data
US 2024/0125338 A1    Apr. 18, 2024

(30) Foreign Application Priority Data

Feb. 13, 2021 (DE) .................. 10 2021 000 749.2

(51) Int. Cl.
*F16K 11/07* (2006.01)
*F15B 13/04* (2006.01)
(Continued)

(52) U.S. Cl.
CPC .......... *F15B 13/0402* (2013.01); *F16K 11/07* (2013.01); *F16K 31/04* (2013.01); *F16K 31/53* (2013.01); *F15B 13/0444* (2013.01)

(58) Field of Classification Search
CPC .......... F16K 11/07; F15B 31/04; F15B 31/53; F15B 13/0402; F15B 13/0409
See application file for complete search history.

(56) References Cited

U.S. PATENT DOCUMENTS 5,806,565 A * 9/1998 Kadlicko ............ F15B 13/0438
137/625.63
2018/0354335 A1* 12/2018 Harrison ............ B60G 17/0525
(Continued)

FOREIGN PATENT DOCUMENTS

| CN | 110529646 A | * 12/2019 | .......... F16K 31/046 |
| DE | 10 2018 207 927 | 11/2019 | .............. F15B 21/08 |
| EP | 4267872 B1 | 8/2024 | .............. F15B 13/04 |

OTHER PUBLICATIONS

Machine Translation CN110529646 (Year: 2019).*
Search Report for International Application No. PCT/EP2022/052236, 4 pages, Feb. 24, 2022.

*Primary Examiner* — Michael R Reid
(74) *Attorney, Agent, or Firm* — Slayden Grubert Beard PLLC

(57) ABSTRACT

Disclosed is a valve device, comprising at least one valve piston arranged in a valve housing in a longitudinally displaceable manner, which valve piston is moved by means of a drive in conjunction with the assigned drive train and interconnects individual fluid ports present in the valve housing in a fluid-conveying manner or separates them from one another. A sensor device monitors the respective positions of the drive train and thus the respective positions of the valve piston in the valve housing.

14 Claims, 7 Drawing Sheets

(51) Int. Cl.
    *F16K 31/04*     (2006.01)
    *F16K 31/53*     (2006.01)
    *F15B 13/044*     (2006.01)

(56) References Cited

U.S. PATENT DOCUMENTS

| | | | |
|---|---|---|---|
| 2020/0300275 A1 | 9/2020 | Biwersi | F15B 13/044 |
| 2021/0207627 A1* | 7/2021 | Biwersi | F15B 15/06 |
| 2024/0125338 A1 | 4/2024 | Biwersi et al. | |

\* cited by examiner

VALVE DEVICE

CROSS-REFERENCE TO RELATED APPLICATIONS

This application claims priority to German Patent Application No. DE 10 2021 000 749.2, filed on Feb. 13, 2021 with the German Patent and Trademark Office.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The invention relates to a valve device comprising at least one valve piston arranged in a valve housing in a longitudinally displaceable manner, which valve piston, moved by means of a drive in conjunction with the assigned drive train, interconnects individual fluid ports present in the valve housing in a fluid-conveying manner or separates them from one another.

Such a valve device is known from DE 10 2015 015 685 A1. An electric motor having a rotor and a stator with stator coils is provided for actuating the valve piston in this way, wherein the drive axis of the electric motor intersects the travel axis of the valve piston at one point or is arranged offset from this point by a maximum of half an average diameter of a fictitious circle through the centers of the stator coils. Using this type of motor arrangement, an overall narrow segment design can be achieved for the valve device as a whole, which is important when a large number of such valves are to be mounted in a side-by-side arrangement on third-party components, such as components of machines and commercial vehicles. Furthermore, electronically controlled electric motors can be used for this known solution and the disadvantages of the low dynamic torque and the required massive reduction with correspondingly strong self-locking inherent in the stepper motors usually used for this purpose, are eliminated in that way.

SUMMARY

Based on this prior art, a need exists to improve the valve device in such a way that a safe position monitoring for the valve piston of the valve device is provided. The need is addressed by the subject matter of the independent claim(s).

Embodiments of the invention are described in the dependent claims, the following description, and the drawings.

DESCRIPTION

Figure 1:
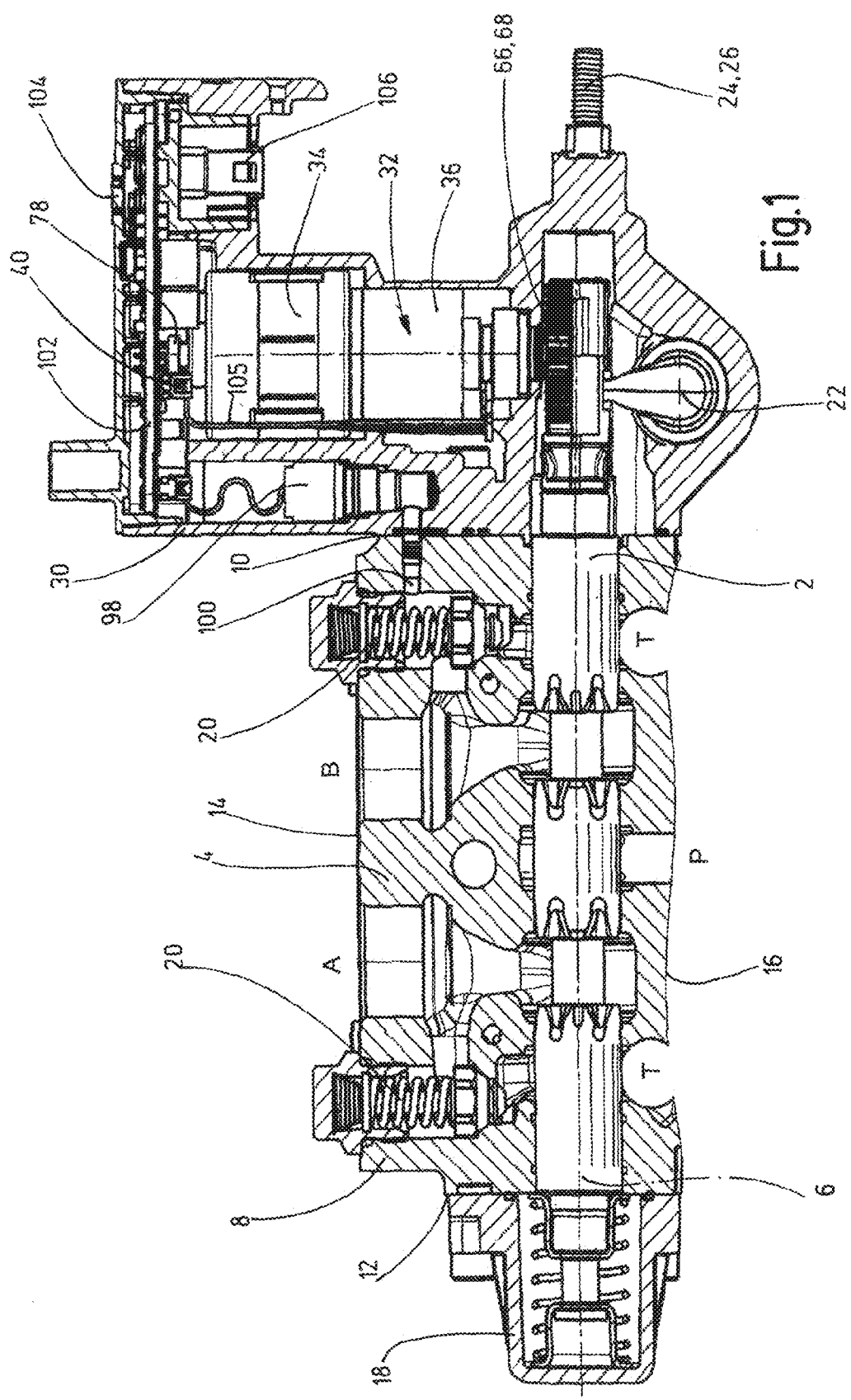
FIG. 1 shows a longitudinal section through an example valve device as a whole.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a valve device is provided. A sensor device monitors the respective positions of the drive train and thus the respective positions of the valve piston in the valve housing. Accordingly, the respective positions of the valve piston in the valve housing can be monitored in a functionally reliable manner, eliminating malfunctioning. The precise detection of the absolute position of the valve piston or valve spool is extremely beneficial for the purpose of functionally reliable systems in order to increase the so-called diagnostic coverage for fluid valves, in particular for hydraulic valves.

A further major benefit is the option of connecting the sensor device to suitable evaluation electronics that are integrated in the valve device as a whole and directly provide for a display of the system status of the valve device, for instance by integrating a status LED display in housing parts of the valve device. Furthermore, values measured by the sensor device can be transmitted to a central control and evaluation unit as part of an electrical longitudinal interconnection of several interconnected valve devices, for instance as part of a centrally organized machine control system.

In some embodiments, provision is made for the drive to be an electric motor and for the drive train to comprise at least one motor shaft, which can be driven by the electric motor and one end of which terminates in a gearbox, a gear shaft of which actuates a drive pinion, which meshes with a rack, which interacts with the valve piston. Due to the gearbox, the high drive speed of the electric motor can be appropriately reduced for the drive pinion, which interacts with the rack of the valve piston, to enable a safe actuation of the valve piston, to which the drive train being subdivided into a motor shaft and a gear shaft contributes. For reliable operation, it is beneficial if the other end of the motor shaft facing away from the gearbox and projecting beyond the electric motor is rotatably mounted in a drive housing.

The subdivision of the drive train into a motor shaft and a gear shaft also has the benefit of the sensor device being able to comprise a first sensor that monitors the motor shaft and there for example being an additional sensor that monitors the gear shaft. In this way, redundancy is achieved for the sensor device and the sensor, which monitors the position of the gear shaft, permits the detection of an absolute position of the valve piston in the assigned valve housing, which increases the degree of diagnostic coverage by using redundant sensors, in this case on the motor shaft and on the gear shaft.

The sensor used may be for example a so-called Hall sensor, which is mounted in the drive housing and interacts with the motor shaft and the gear shaft, which each comprise a permanent magnet for a matching measuring tap.

In some embodiments, a planetary gear set, for example a two-stage planetary gear set, is used as the gearbox for reducing the motor speed to drive the drive pinion for the rack-and-pinion drive of the valve piston between the motor shaft and the gear shaft.

In some embodiments, provision is made for the electric motor to be a brushless DC motor. The three phases usually present for such a DC motor can be short-circuited using suitable electronics, with the option of dissipating kinetic energy, as the brushless DC motor then acts as a generator. This is the case, for instance, if the valve piston or valve spool is fully deflected and an energy accumulator, as a rule in the form of a compression spring, accelerates the motion to a zero or initial position. Overall, this results in the significant benefits for valve actuation as a whole listed below:

- if electromechanical braking occurs during highly dynamic motions of the motor, e.g., during maximum acceleration in combination with an abrupt loss of voltage and thus a loss of control over the motor and the electronics, this equals to the fail-safe operation of the valve device.
- at standstill, without active electrical actuation, the holding torque is greatly increased, thus preventing any undesired motion of valve piston or valve spool.
- in addition to direct short-circuiting, it is also possible to use a power resistor to activate a short-circuit, wherein the resistance value can be used to determine the braking force.

In some embodiments, provision is made for the valve housing and the actuator housing to represent independent housing units that can be intercoupled such that, if necessary, existing valve housings can be retrofitted with fluid ports and valve pistons or valve spools including a matching actuator in conjunction with electronic control monitoring.

Below, the valve device according to embodiments is explained in more detail based on the schematic (not to scale) FIGS. Specific references to components, process steps, and other elements are not intended to be limiting. Further, it is understood that like parts bear the same or similar reference numerals when referring to alternate FIGS.

With reference to the FIGS., the valve device is explained in more detail using a directional control valve in the form of a so-called spool valve by way of example. If terms such as "top", "top end", 'bottom end' and 'bottom' are used in this application, they refer to a normal mounting position as shown in the FIGS.

According to the illustration in FIG. 1, a valve piston 2 or spool piston is guided in a valve housing 4 to be longitudinally movable along an axis 6. The valve housing 4 comprises a pair each of opposing lateral faces 8 and end faces 10, 12. Furthermore, the valve housing 4 has a top end 14 and a bottom end 16. The bottom end 16, according to the illustration in FIG. 1, is shown only broken off for the sake of simplicity. Along the top end 14, the utility ports A, B open out from the valve housing 4 and along the bottom end 16, the two tank ports T, which hold the pressure supply port P between them, open out. In their entirety, the above ports A, B, P, T are the fluid ports of the valve housing 4.

A spring arrangement 18 located in the end area of the left housing having a compression spring as energy accumulator, which compression spring adjoins the left end face 12 of the valve housing 4, provides a neutral or middle position for the valve piston 2 in the usual manner for directional control valves of this type, as shown in FIG. 1. Furthermore, the valve housing 4 comprises two so-called spring-loaded pressure relief valves 20, which, for protection in the event of excessive pressure at the respective utility ports A, B, open the fluid path to the assigned tank port T and in this way counteract any unwanted pressure increase.

If, as viewed in the direction of FIG. 1, the valve piston 2 moves from its shown neutral position to the right into an actuation position, the pressure supply port P for a pressurized fluid supply is connected to the utility port A and in the return line the utility port B is connected in the direction of the right tank port T. When the valve piston is deflected to the left, however, the utility port B is connected to the pump port or pressure supply port P and the utility port A is connected to the left tank port T. In this way, for instance, a hydraulic power cylinder can be extended and retracted, the piston side of which hydraulic power cylinder is connected to the utility port A for fluid supply and its rod side is connected to the utility port B. Such hydraulic circuitry is common and it will not be discussed in more detail at this point.

Furthermore, the valve device according to FIG. 1 also has an emergency actuation 22, which interacts with the valve piston 2 and, for instance, permits the valve piston 2 to be returned to its initial or neutral position shown in FIG. 1. In addition, a stroke length limiter 24 having two set screws 26, 28 is also provided for the valve piston 2. This latter design of such valve devices is also common, it will not be discussed in more detail at this point.

Viewed in the direction of FIG. 1, a drive housing 30 adjoins the right-hand end face 10 of the valve housing 4 and accommodates a drive train designated as a whole by 32. The drive train 32 comprises, among other things, an electric motor 34 as a drive, for example designed as a brushless DC motor. The details of the electric motor 34 are shown in particular in FIG. 4. A gearbox 36, in particular in the form of a reduction gear, adjoins the bottom end or lower end of the electric motor 34. The gearbox 36 as a two-stage planetary gear set is shown in particular in FIG. 5. For example, all movable parts of the drive train 32 in the drive housing 30 are an oil-immersed. Furthermore, there is a sensor device 38, shown in particular in FIG. 2, having two sensors in the form of an upper Hall sensor 40 and in the form of a lower Hall sensor 42. This sensor device 38 with its two Hall sensors 40, 42 permits the position monitoring of parts of the drive train 32 and in that way directly permits a conclusion to be drawn on the position of the valve piston 2 in the valve housing 4. As shown in particular in FIG. 4, the drive train 32 comprises a motor shaft 44 that can be driven by the electric motor 34. The two free ends of the motor shaft 44 exit from the housing of the electric motor 34 and the end area of the motor shaft is rotatably guided in its in usual bearing points 48. The electric motor 34 accommodated in the motor housing 46 comprises a rotor 52 rotatably guided in stator coils 50, which is rotatably held in the axial position in the motor housing 46 by means of spring preload of a compression spring 54 and in that way transmits its drive torque to the motor shaft 44. As shown in the embodiment according to FIG. 2, the box-shaped motor housing 46 is integrated into the drive housing 30.

Figure 3:
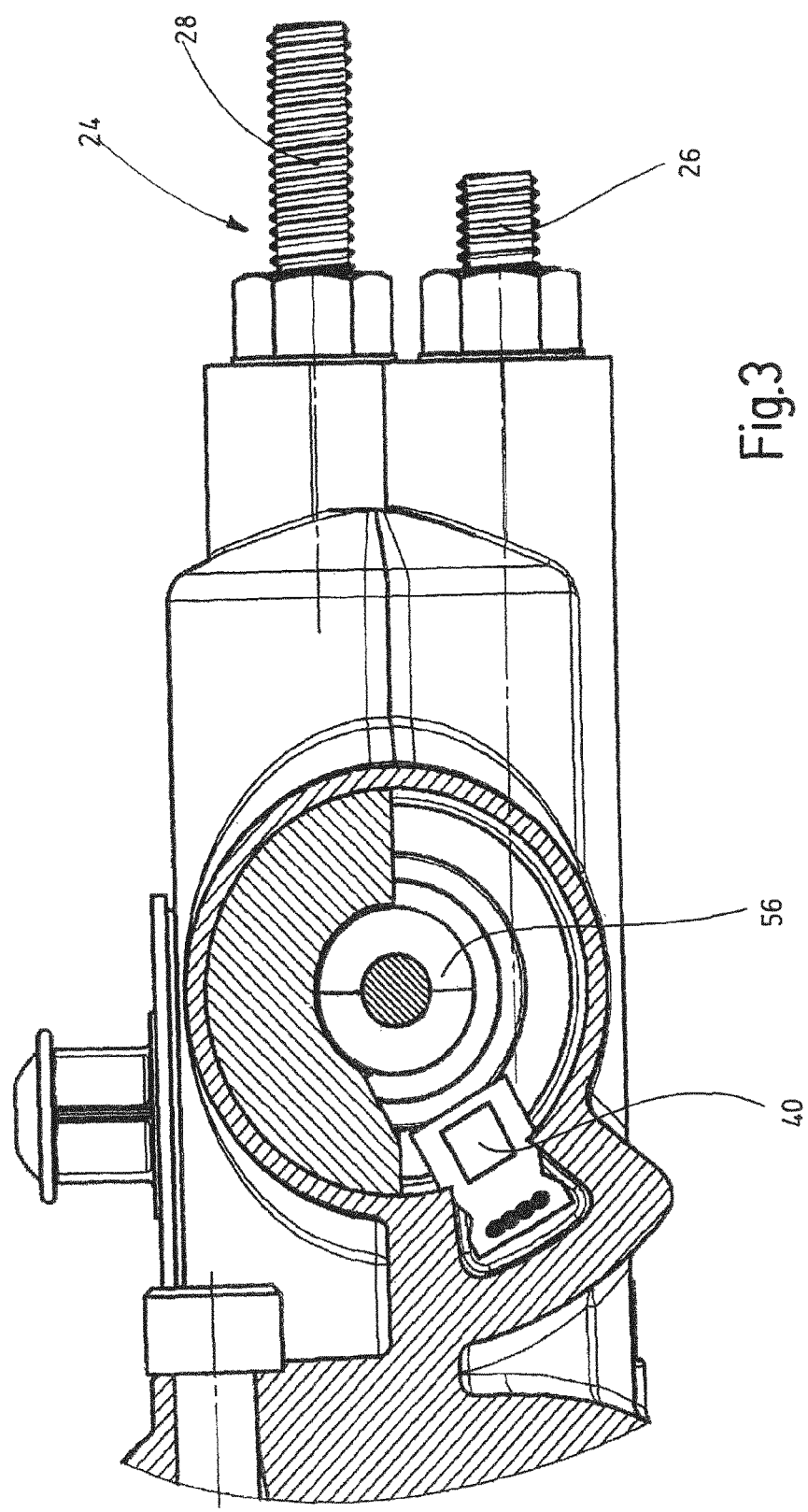
FIG. 3 shows a section of FIG. 2 showing an example Hall sensor for the motor shaft in a top view.
Figure 4:
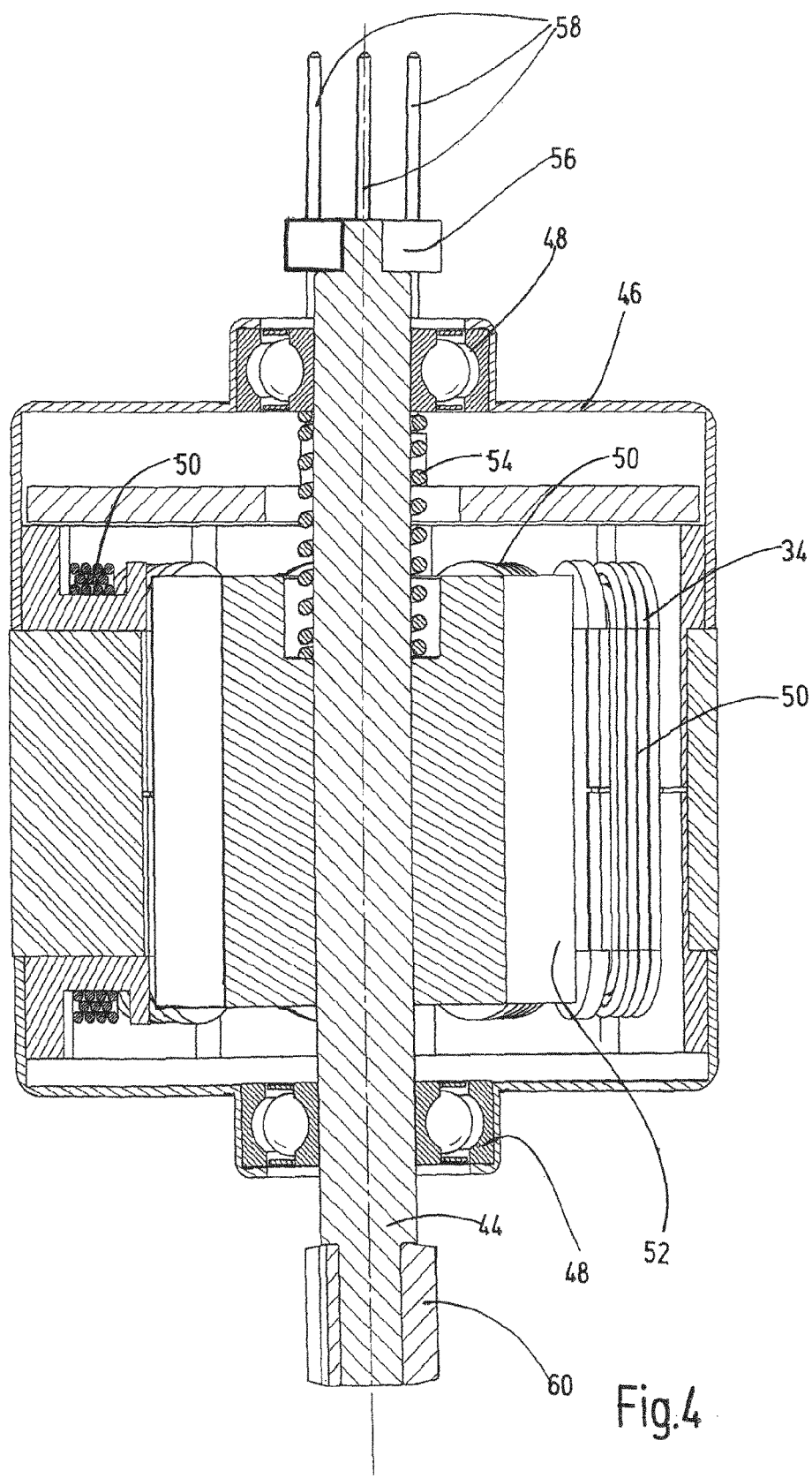
FIG. 4 shows a longitudinal section through an example electric motor and example bearings for the rotatable guidance of the motor shaft.

The motor shaft 44 comprises a permanent magnet 56 at its upper end, as viewed in the direction of FIG. 4, and ports 58 in the form of a plug part for supplying power to the stator coils 50 can also be seen in the upper area. At its opposite end, the motor shaft 44 is provided with a type of spline 60 for engaging with an assigned receiving location 62 of an upper, first planetary stage 63 of the two-stage planetary gear set 36. In particular, as shown in FIG. 3, the upper permanent magnet 56 interacts with the upper Hall sensor 40 that is stationarily mounted in the drive housing 30.

Figure 2:
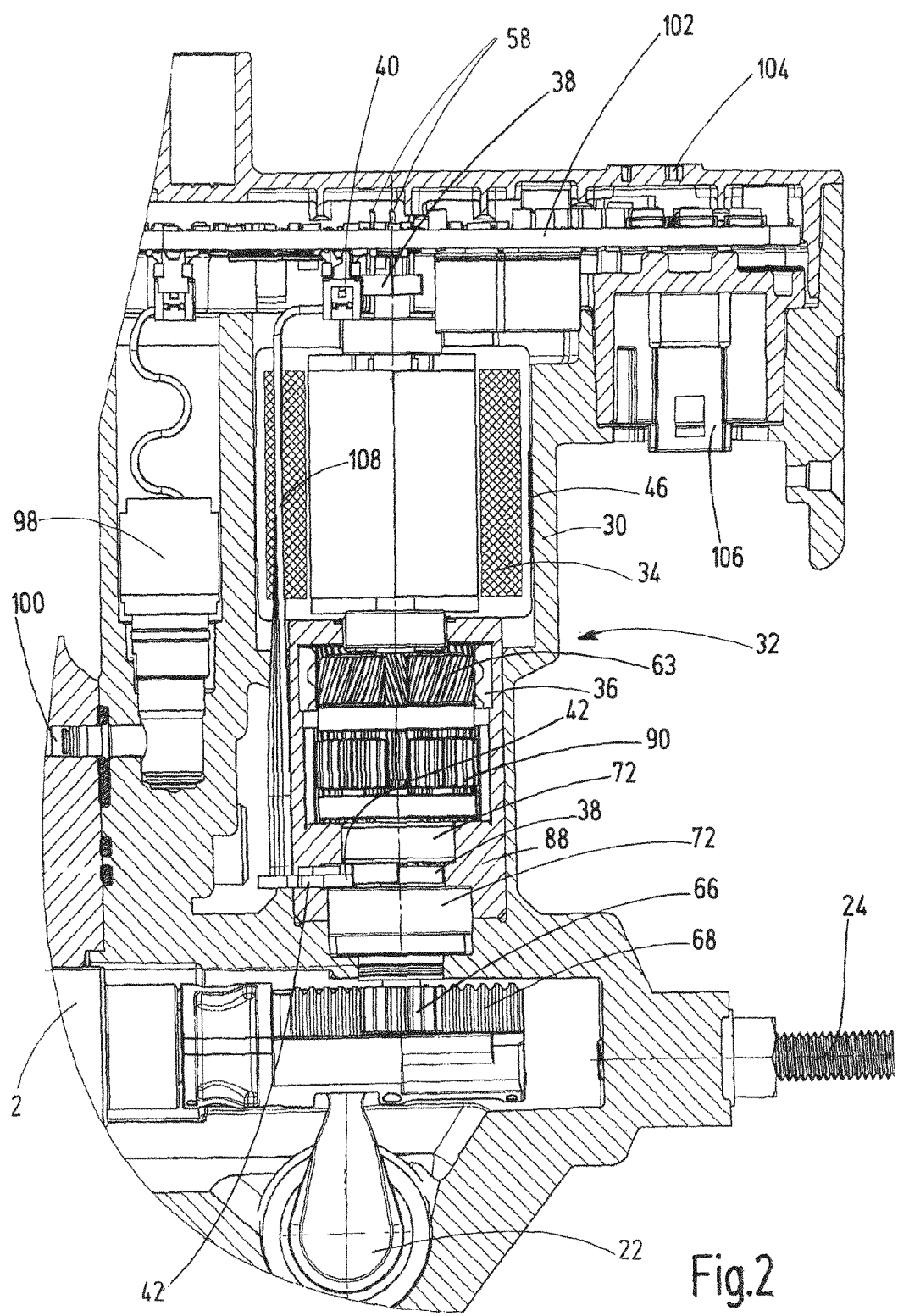
FIG. 2 shows a longitudinal section through the drive housing and drive train of the device of FIG. 1.
Figure 5:
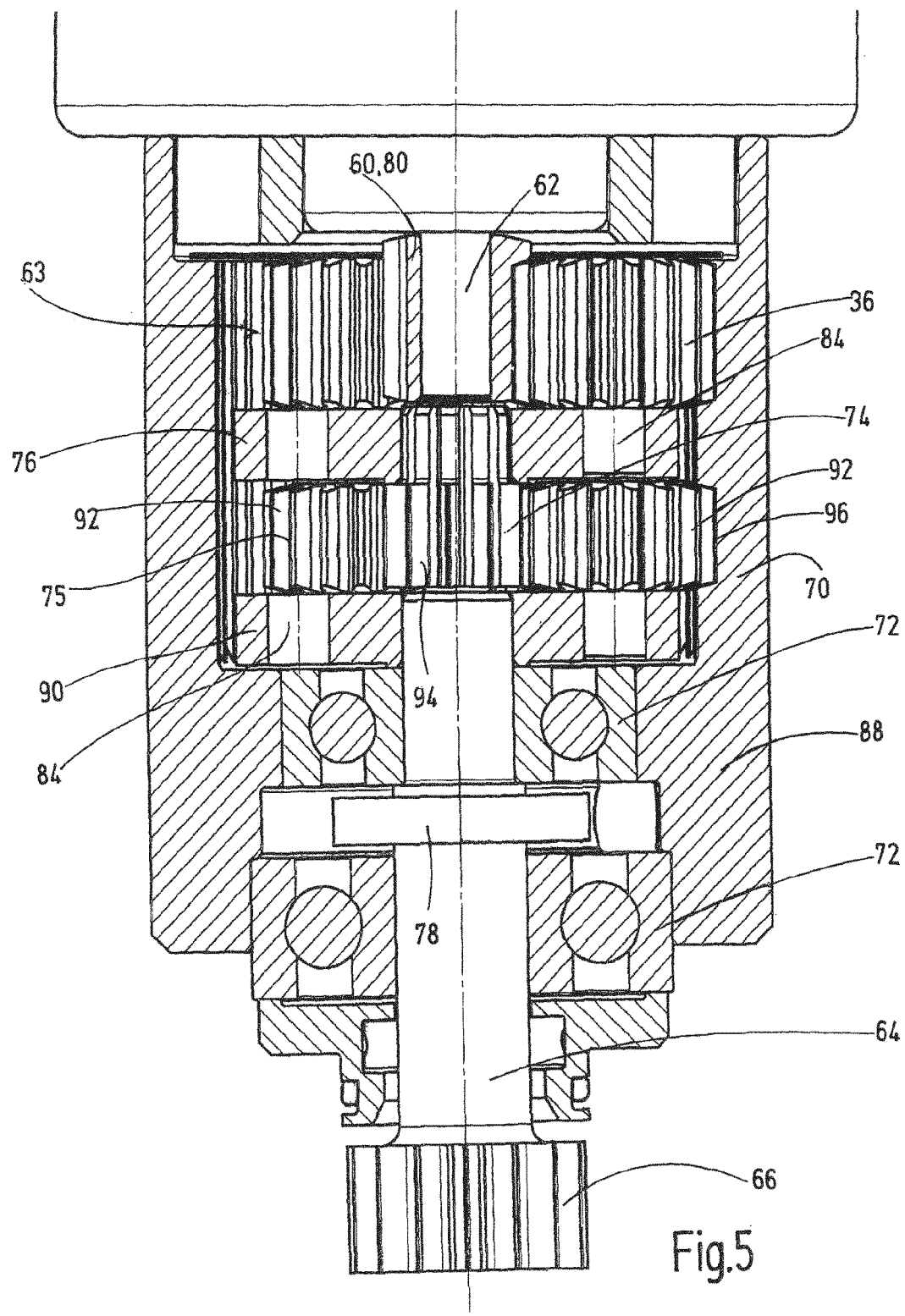
FIG. 5 shows a section of an example two-stage planetary gear set having gear shaft and assigned sensor parts, which planetary gear set is located below the electric motor shown in FIG. 4.

Viewed in the direction of view of FIG. 5, the lower end of the gearbox 36 opens out into a gear shaft 64, at the lower end of which a drive pinion 66 is arranged, which, as shown in FIGS. 1 and 2, meshes with a rack 68, on the left side of which the valve piston 2 adjoins, for example integrally formed with the rack 68. The gear shaft 64 is rotatably, but axially immovably, guided in the gear housing 70 with the gearbox 36 by means of two bearing points 72. At its end opposite from the drive pinion 66, the output of the gear shaft 64 is in turn attached to a second, lower planetary stage 75 of the planetary gear set 36 by means of a splined connection 74. The splined shaft connection 74, as shown in FIG. 5, still extends into a central planet carrier 76 of the gearbox 36, but without transmitting any torque in this area. Between the two bearing points 72 there is another permanent magnet 78, which interacts with the gear shaft 64 for co-rotation and actuates the lower Hall sensor 42 (see FIG. 2).

Figure 6:
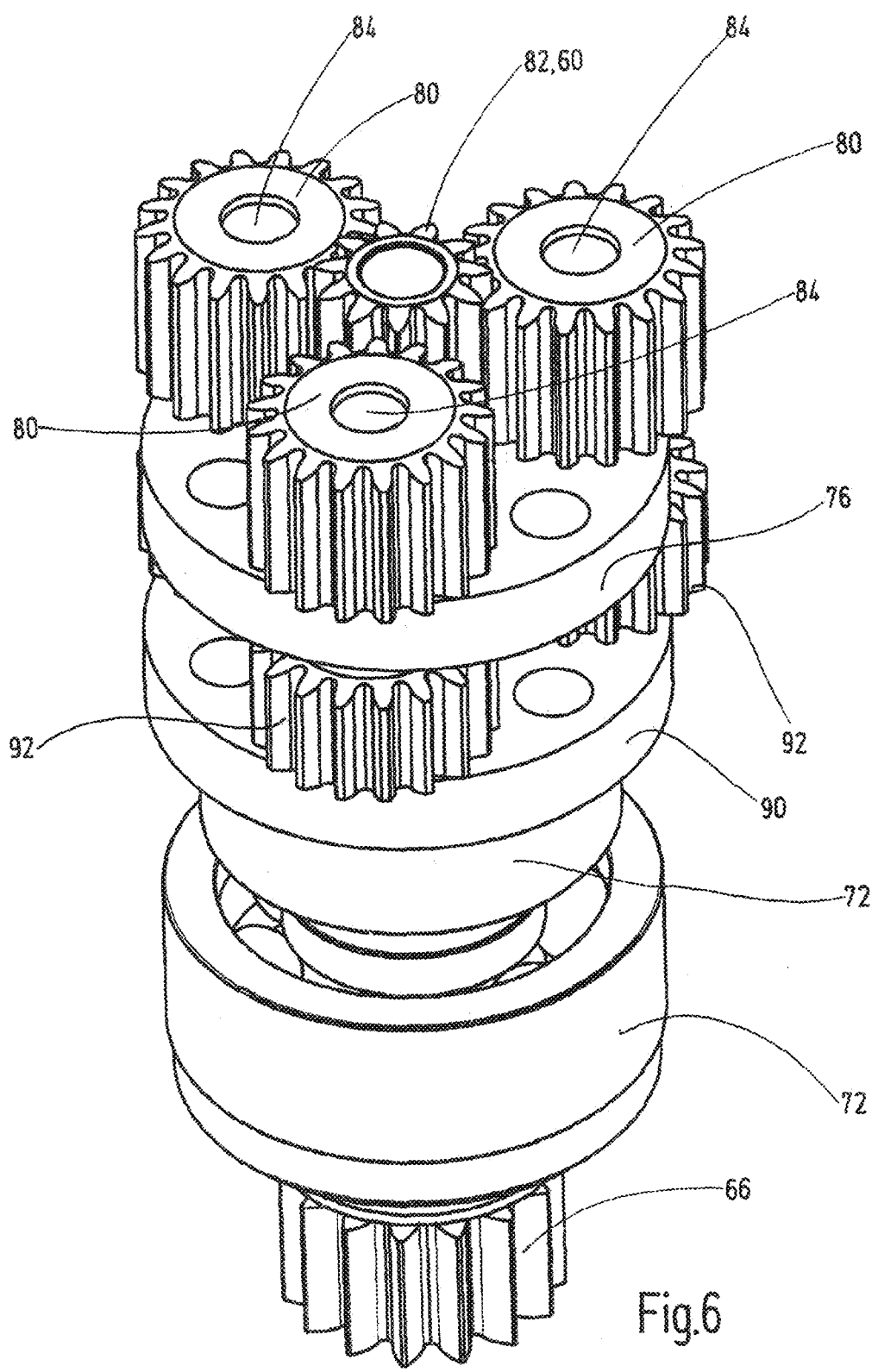
FIG. 6 shows a view of the planetary gear set of FIG. 4.
Figure 7:
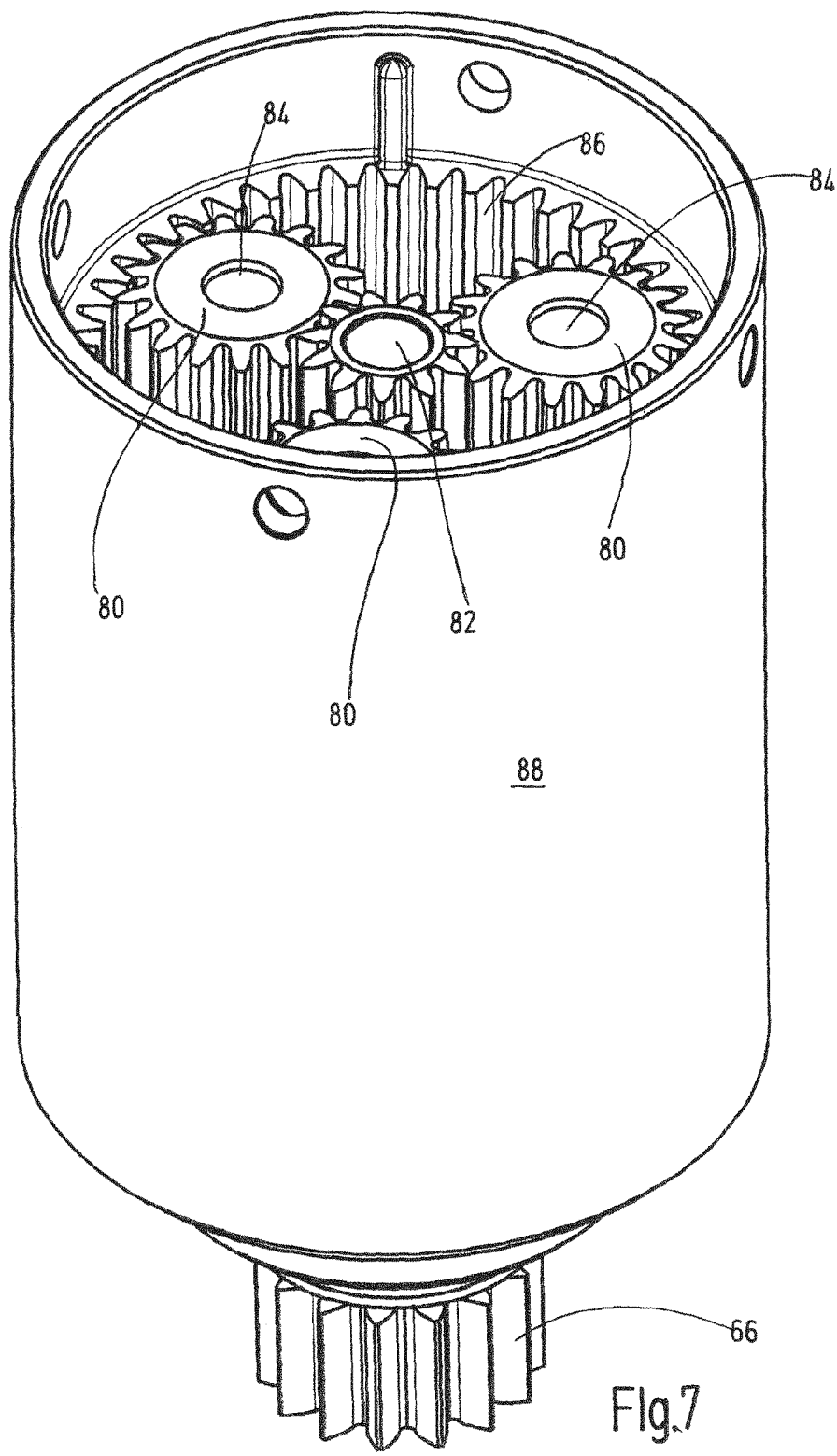
FIG. 7 shows a perspective view of the planetary gear set of FIG. 5 with ring gear.

As shown in particular in FIGS. 6 and 7, in conjunction with FIG. 5, the two-stage planetary gear set 36 comprises the first planetary stage 63 with three planetary gears 80 rotating about a sun gear 82, which engages with the receiving location 62 of the first planetary gear stage 63 in the manner of a spline 60. The three planetary gears 80 having the same toothing are rotatably guided on the first, upper planet carrier 76 via axles 84. Further, the three planetary gears 80 mesh on the outer circumference as shown in FIG. 7 with a ring gear 86 that is attached to the gearbox shell 88. As shown in particular in the illustration according to FIG. 5, the individual axles 84 pass through the upper planet carrier 76 and are routed to a lower planet carrier 90. In this respect, three further planetary gears 92 are rotatably guided on the axles 84 coaxially to the three planetary gears 80 and extend between the upper planet carrier 76 and the lower planet carrier 90. The three other planetary gears 92 each comprise a larger number of teeth than a planetary gear 80 of the first planetary stage 63 above. The three further planetary gears 92, in conjunction with their second planet carrier 90 and the central sun gear 94, which in this respect also forms a kind of splined connection 74 with the planetary gears 92, form the second planetary stage 75 of the gearbox 36. Also in this respect, the three further planetary gears 92 then mesh on the outer circumference along a further ring gear 96, whose number of teeth has been adapted. According to the embodiment shown in FIG. 5, both the first ring gear 86 and the second ring gear 96 are part of the gearbox shell 88, which according to the embodiment shown in FIG. 2 is in turn an integral part of the drive housing 30.

If the motor shaft 44 is driven by means of the electric motor 34, the assigned sun gear 82 drives the three rotating planetary gears 80 and these drive the three further planetary gears 92 in the same direction of rotation via their axles 84, wherein these pass on their rotary motion in this direction to the central sun gear 94 of the second planetary stage 75 on the output side, which, connected to the gear shaft 64, drives the drive pinion 66 in a rotating manner for the rack-and-pinion drive of the valve piston 2. In so doing, the respective planetary gears 80, 92 roll on their assigned ring gears 86, 96 on the inside of the gearbox shell 88. In this way, very high speeds of the electric motor can be reduced to low drive speeds for the drive pinion 66.

For a drive motion of the toothed rack 68 and valve piston 2 in this direction, the rotary motion of the motor shaft 44 is monitored by the upper Hall sensor 40 and the rotary motion of the gear shaft 64, which rotates at a reduced speed, is monitored by the lower Hall sensor 42. Because the gearbox 36 provides a defined reduction ratio, redundant monitoring for the motion of the valve piston 2 can be established in this way.

Furthermore, it is possible, as shown in FIG. 1, to incorporate an additional sensor in the form of a pressure sensor 98 into the edge of the drive housing 30, which pressure sensor monitors the fluid pressure in the area of the right-hand pressure relief valve 20 via a cross channel 100.

Further, the top of the drive housing is closed by a cover part including a circuit board 102 received therein. In a beneficial manner, said circuit board 102 is held horizontally above the electric motor 34, such that in this respect the position measurement can be performed in a space-saving manner via the upper Hall sensor 40, i.e., via the permanent magnet 78 seated on the motor shaft 44. Furthermore, a simple connection of the external connector contacts in the form of the ports 58 is implemented in this way, which can be performed within the framework of easily implemented press-fit contacts into the circuit board 102. Further, the circuit board 102 includes an externally exposed LED indicator 104 that can be used to view the operating status for the entire valve device. Via a connector arrangement 106 mounted on the bottom end of the circuit board 102, it is also possible to centrally monitor and actuate various valve devices arranged one behind the other as shown in FIG. 1 in a segmental design by a machine control system as part of a type of longitudinal interlinking (not shown).

Furthermore, the two Hall sensors 40, 42 are interconnected via a joint, electrical supply line 108.

What is claimed is:

1. A valve device, comprising at least one valve piston arranged in a valve housing in a longitudinally displaceable manner, which valve piston moves using a drive in conjunction with an assigned drive train, interconnects individual fluid ports present in the valve housing in a fluid-conveying manner or separates them from one another; wherein
   a sensor monitors the respective positions of the drive train and thus the respective positions of the valve piston in the valve housing;
   the drive is an electric motor;
   the drive train comprises at least one motor shaft, which is drivable by the electric motor;
   one end of the motor shaft opens into a gearbox, which using a gear shaft actuates a drive pinion, which meshes with a rack, which interacts with the valve piston; wherein
   the sensor comprises a first sensor that monitors the motor shaft and a second sensor monitoring the gear shaft; and
   a permanent magnet is mounted directly to the gear shaft, which magnet actuates the second sensor during rotation of the gear shaft.

2. The valve device of claim 1, wherein the other end of the motor shaft facing away from the gearbox, projecting beyond the electric motor, is rotatably mounted in a drive housing.

3. The valve device of claim 1, wherein the first sensor monitoring the motor shaft is stationarily mounted in a drive housing and monitors a part of the motor shaft, which projects upwards above the electric motor.

4. The valve device of claim 1, wherein the second sensor is stationarily mounted in a drive housing and monitors a part of the gear shaft that projects downwards beyond the electric motor in the direction of the drive pinion of the rack.

5. The valve device of claim 1, wherein one or more of: a) the first sensor, and b) the second sensor is a Hall sensor, which interacts with the motor shaft and/or the gear shaft, respectively.

6. The valve device of claim 1, wherein a planetary gear set is used as the gearbox for reducing the motor speed to drive the drive pinion for the rack and pinion drive of the valve piston between the motor and the gear shaft.

7. The valve device of claim 1, wherein the electric motor is a brushless DC head.

8. The valve device of claim 1, wherein the valve housing part and an actuator housing represent independent housing units that can be intercoupled.

9. The valve device of claim 2, wherein the first sensor is stationarily mounted in the drive housing and monitors a part of the motor shaft, which projects upwards above the electric motor.

10. The valve device of claim 2, wherein the second sensor is stationarily mounted in the drive housing and monitors a part of the gear shaft that projects downwards beyond the electric motor in the direction of the drive pinion of the rack.

11. The valve device of claim 3, wherein the second sensor is stationarily mounted in the drive housing and monitors a part of the gear shaft that projects downwards beyond the electric motor in the direction of the drive pinion of the rack.

12. The valve device of claim 3, wherein the first sensor is a Hall sensor, which comprises a permanent magnet for a measured value tap.

13. The valve device of claim 4, wherein the second sensor is a Hall sensor, which comprises the permanent magnet for a measured value tap.

14. The valve device of claim 1, wherein the first sensor and the second sensor are arranged on a common axis, wherein the first sensor being an upper sensor and the second sensor being a lower sensor.

* * * * *